United States Patent
Yamamoto et al.

(10) Patent No.: US 9,746,949 B2
(45) Date of Patent: Aug. 29, 2017

(54) ELECTRONIC DEVICE FOR EFFICIENTLY PERFORMING DATA TRANSMISSION AND METHOD FOR CONTROLLING THE SAME

(71) Applicant: Japan Display Inc., Minato-ku (JP)

(72) Inventors: Michio Yamamoto, Tokyo (JP); Jouji Yamada, Tokyo (JP); Hirofumi Nakagawa, Tokyo (JP); Kohei Azumi, Tokyo (JP); Makoto Hayashi, Tokyo (JP); Hiroshi Mizuhashi, Tokyo (JP); Kozo Ikeno, Tokyo (JP); Yoshitoshi Kida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/182,432

(22) Filed: Feb. 18, 2014

(65) Prior Publication Data

US 2014/0292677 A1  Oct. 2, 2014

(30) Foreign Application Priority Data

Mar. 29, 2013  (JP) .................................. 2013-073874

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ...... G06F 3/044–3/048; G06F 3/03547; G06F 1/169–1/1698; G06F 3/0412–3/0428;
(Continued)

(56) References Cited

U.S. PATENT DOCUMENTS 8,928,609 B2 * 1/2015 Italia et al. .................... 345/173
2006/0288185 A1 12/2006 Brisse et al.
(Continued)

FOREIGN PATENT DOCUMENTS

CN    102375639 A    3/2012
JP    11-184630 A    7/1999
(Continued)

OTHER PUBLICATIONS

U.S. Appl. No. 14/186,216, filed Feb. 21, 2014, Azumi, et al.
(Continued)

*Primary Examiner* — Sanghyuk Park
(74) *Attorney, Agent, or Firm* — Oblon, McClelland, Maier & Neustadt, L.L.P.

(57) ABSTRACT

According to one embodiment, an electronic device includes a display device includes a plurality of first electrodes arranged in a matrix form, second electrodes opposite to the first electrodes, the second electrodes including a plurality of electrode patterns extending in a first direction and aligned in a second direction to cross the first direction, and third electrodes opposite to the second electrodes, the third electrodes including a plurality of electrode patterns extending in the second direction and aligned in the first direction, a display driver applying a sensor drive signal to the second electrodes, a detection circuit transmitting a detection data including physical quantity data detected from the plurality of electrode patterns of the third electrodes at each time when the sensor drive signal is applied to the second electrodes, and an application processor processing the detection data received from the detection circuit.

7 Claims, 6 Drawing Sheets

(58) Field of Classification Search
CPC ...... G06F 3/0488–3/04897; G06F 2200/1634; G06F 2203/0339–2203/04809
USPC .......................................................... 345/173
See application file for complete search history.

(56) References Cited

U.S. PATENT DOCUMENTS

| | | | |
|---|---|---|---|
| 2008/0062139 | A1 | 3/2008 | Hotelling et al. |
| 2010/0053093 | A1* | 3/2010 | Kong ..................... G06F 3/041 345/173 |
| 2010/0182273 | A1 | 7/2010 | Noguchi et al. |
| 2010/0283760 | A1* | 11/2010 | Leung ..................... G06F 3/044 345/174 |
| 2010/0328259 | A1 | 12/2010 | Ishizaki et al. |
| 2011/0234508 | A1 | 9/2011 | Oda et al. |
| 2012/0044180 | A1 | 2/2012 | Matsui et al. |
| 2012/0050217 | A1* | 3/2012 | Noguchi et al. ............. 345/174 |
| 2012/0249484 | A1* | 10/2012 | Hata ..................... G06F 3/0421 345/175 |
| 2012/0262435 | A1 | 10/2012 | Park et al. |
| 2013/0076688 | A1 | 3/2013 | Tokutake |
| 2014/0292681 | A1* | 10/2014 | Azumi et al. ................. 345/173 |

FOREIGN PATENT DOCUMENTS

| | | |
|---|---|---|
| JP | 2008-065730 A | 3/2008 |
| JP | 2009-244958 | 10/2009 |
| JP | 2010-152827 A | 7/2010 |
| JP | 2010-267222 A | 11/2010 |
| JP | 2011-2926 A | 1/2011 |
| JP | 2011-28721 A | 2/2011 |
| JP | 2011-59793 A | 3/2011 |
| JP | 2011-170834 A | 9/2011 |
| JP | 2011-175440 A | 9/2011 |
| JP | 2011-181077 A | 9/2011 |
| JP | 2011-258143 A | 12/2011 |
| JP | 2012-043394 A | 3/2012 |
| JP | 2012-48295 | 3/2012 |
| JP | 2012-69083 A | 4/2012 |
| JP | 2012-230657 A | 11/2012 |
| JP | 2012-234472 A | 11/2012 |
| JP | 2012-238210 A | 12/2012 |
| JP | 2012-252627 A | 12/2012 |
| JP | 2013-003639 A | 1/2013 |
| JP | 2013-37674 A | 2/2013 |
| JP | 2013-506905 A | 2/2013 |
| KR | 10-2012-0120006 A | 11/2012 |
| TW | 200949555 A | 12/2009 |
| WO | WO 2011/027665 A1 | 3/2011 |

OTHER PUBLICATIONS

Office Action issued on Aug. 4, 2015 in Japanese Patent Application No. 2013-073875, along with its English translation.
Combined Office Action and Search Report issued Jun. 10, 2015 in Taiwanese Patent Application No. 103107077 (with English language translation).
Office Action issued Jul. 21, 2015 in Japanese Patent Application No. 2013-073874 (with English language translation).
Office Action issued on Aug. 31, 2015 in Korean Patent Application No. 10-2014-0034457, along with its English translation.
Office Action issued on Dec. 6, 2016 in Japanese Patent Application No. 2015-249879 (with English translation).
Combined Chinese Office Action and Search Report issued Jun. 22, 2016 in Patent Application No. 201410119329.X (with English language translation).

* cited by examiner

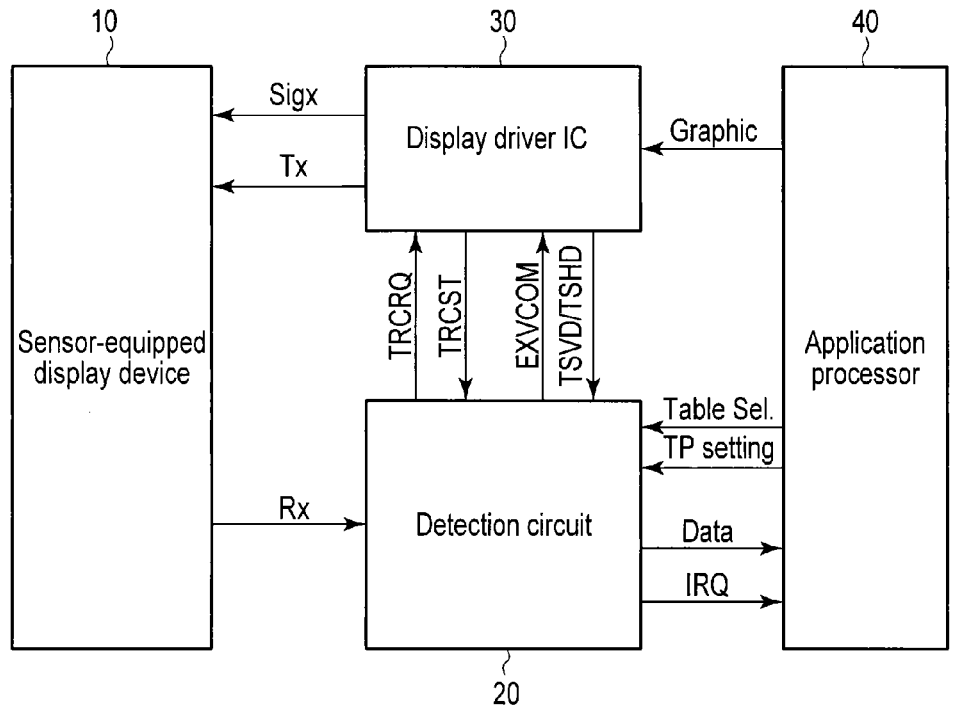
F I G. 1
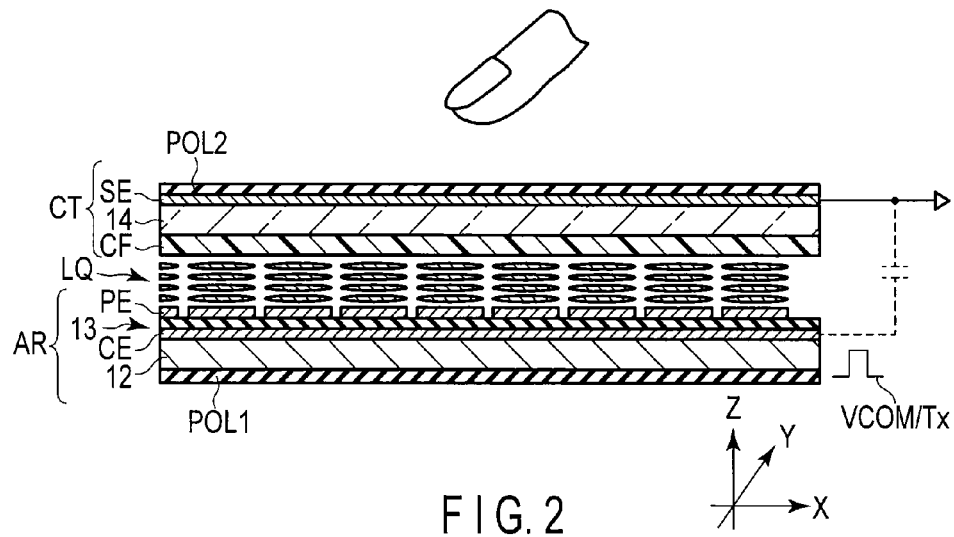
F I G. 2

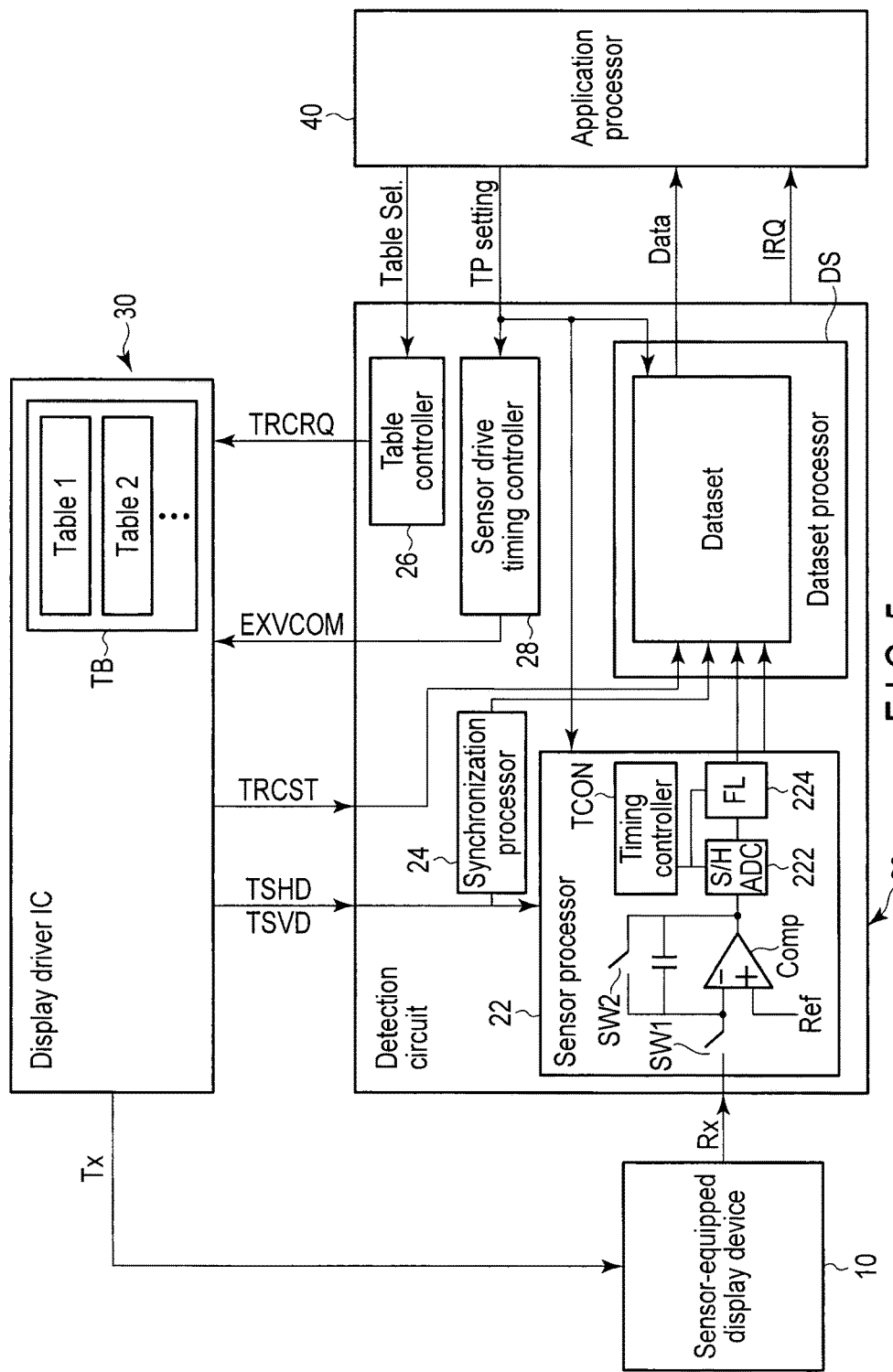
F I G. 5

| H-Sync Mode ||
|---|---|
| Tx #1 | Tx #2 ~ Tx #n |
| Raw data ||
| DDI state | DDI state (optional) |
| Touch IC state | Touch IC state (optional) |
| Start flag | Tx number (optional) |
| Frame index (optional) ||

FIG. 6

ELECTRONIC DEVICE FOR EFFICIENTLY PERFORMING DATA TRANSMISSION AND METHOD FOR CONTROLLING THE SAME

CROSS-REFERENCE TO RELATED APPLICATIONS

This application is based upon and claims the benefit of priority from Japanese Patent Application No. 2013-073874, filed Mar. 29, 2013, the entire contents of which are incorporated herein by reference.

FIELD

Embodiments described herein relate generally to an electronic device and a method for controlling the same.

BACKGROUND

Mobile electronic devices such as a mobile phone, smart phone, tablet terminal, and notebook computer have been used popularly. Such electronic devices include an input panel which is integrated with a display panel, for example. When a user touches a display screen of the device, the input panel detects a position of contact thereon. To detect the position of contact, the input panel comprises a sensor to detect a change in capacitance, for example.

Conventionally, positional coordinates of contacts have been calculated by a module including the input panel. Thus, the module including the input panel had no need to output three dimensional information including information of the positional coordinates of contacts on the input panel or a physical quantity (capacitance value between electrodes or voltage value of sensing electrodes) at the contact position to an application processor.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block figure schematically showing a structural example of an electronic device of one embodiment.

FIG. 2 is an exemplary sectional view schematically showing a structure of the sensor-equipped display device shown in FIG. 1.

FIG. 5 is an exemplary block view schematically illustrating a structure of a detection circuit and a display driver of the electronic device shown in FIG. 1.

FIG. 6 is an exemplary view illustrating an example of contents of dataset.

DETAILED DESCRIPTION

Figure 3:
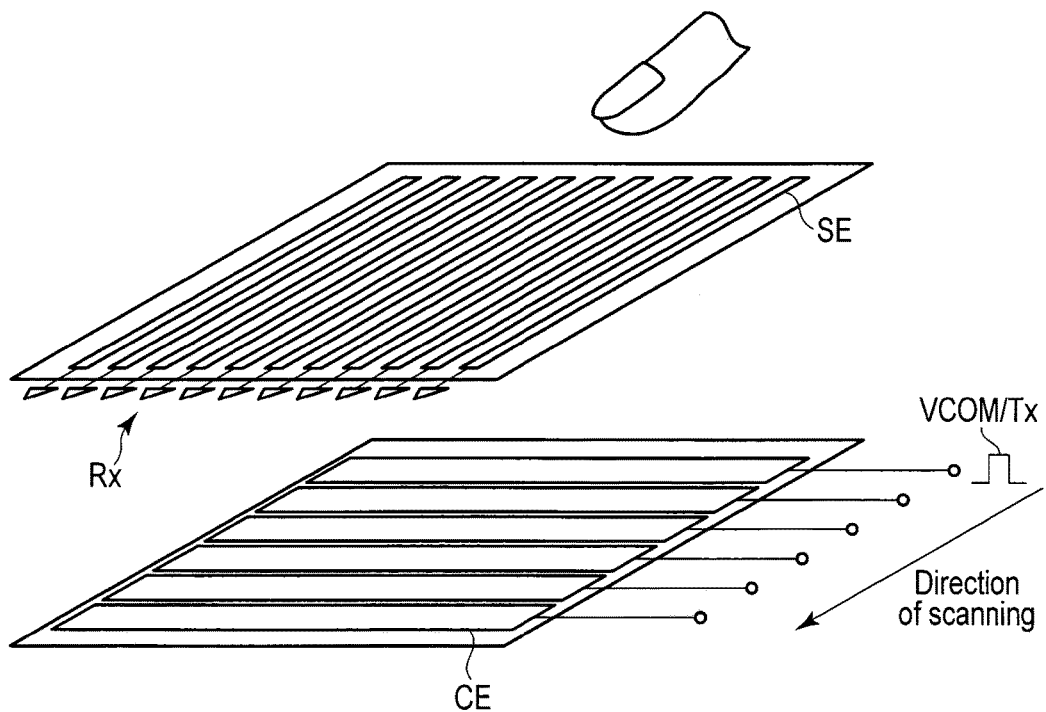
FIG. 3 is an exemplary perspective view illustrating a structure of a common electrode and a sensing electrode of the sensor-equipped display device shown in FIG. 2.

Various embodiments will be described hereinafter with reference to the accompanying drawings.

In general, according to one embodiment, an electronic device includes: a display device having a plurality of first electrodes arranged in a matrix form, second electrodes opposite to the first electrodes, the second electrodes including a plurality of electrode patterns extending in a first direction and aligned in a second direction to cross the first direction, and third electrodes opposite to the second electrodes, the third electrodes including a plurality of electrode patterns extending in the second direction and aligned in the first direction; a detection circuit configured to transmit a detection data including physical quantity data detected from the plurality of electrode patterns of the third electrodes at each time when the sensor drive signal is applied to the second electrodes; and an application processor configured to process the detection data received from the detection circuit.

Hereinafter, the electronic device and a control method of the same according to the embodiments are described in details with reference to the figures.

FIG. 1 is an exemplary block figure schematically showing a structural example of an electronic device of one embodiment.

The electronic device of the present embodiment comprises a sensor-equipped display device 10, detection circuit 20, display driver 30, and application processor 40. Note that the application processor 40 is, for example, a semiconductor integrated circuit (LSI) which is incorporated into the electronic device such as a mobile phone. The application processor 40 instructs software such as an operating system (OS) to execute a plurality of processes such as Web-browsing process and multi-media process in combination. The application processor 40 is a high speed processor and it may be a dual-core or quad-core processor. The function speed is preferably 500 MHz or more, and more preferably, 1 GHz.

The sensor-equipped display device 10 comprises a display device and a sensor. The sensor-equipped display device 10 outputs a sensor detection value Rx to the detection circuit 20, displays an image according to an image display signal Sigx received from the display driver 30, and drives the sensor according to a sensor drive signal Tx.

The detection circuit 20 combines the detection value Rx received from the sensor-equipped display device 10 with data indicative of various information items to generate a dataset Data and outputs the dataset Data to the application processor 40. Furthermore, the detection circuit 20 outputs a table selection request TRCRQ to the display driver 30 according to a table selection signal (Table Sel.) received from the application processor 40. Furthermore, the detection circuit 20 outputs a control signal EXVCOM which controls timing to drive the sensor to the display driver 30 according to a sensor setting signal (TP setting) received from the application processor 40.

The display driver 30 processes graphic data received from the application processor 40 into data displayable on the display device 10 and outputs the image display signal Sigx to the display device 10. The display driver 30 applies the sensor drive signal Tx to the display device 10 according to the control signal EXVCOM received from the detection circuit 20.

The application processor 40 executes various processes using raw data based on the sensor detection value Rx obtained from the dataset Data received from the detection circuit 20. The raw data is described below. The application processor 40 acquires a state of the display driver 30 from a signal included in the dataset Data, controls the display driver 30 through the detection circuit 20, and synchronizes the detection circuit 20 with the display driver 30.

FIG. 2 is an exemplary sectional view schematically showing a structure of the sensor-equipped display device 10 shown in FIG. 1. In FIG. 2, a first direction X is substantially orthogonal to a second direction Y, and a third direction Z is substantially orthogonal to a plane defined by the first direction X and the second direction Y.

The sensor-equipped display device 10 uses a liquid crystal display device as its display device, and configures a capacitive sensor in which a part of electrodes originally implemented in the liquid crystal display device (common electrode CE described below) and a drive signal for display (common drive signal VCOM described below) are utilized.

The sensor-equipped display device 10 comprises array substrates AR, counter substrates CT, and liquid crystal layers LQ held between the array substrates AR and the counter substrates CT.

The array substrate AR comprises a first polarizer POL1, TFT substrate 12, common electrode CE, and pixel electrode PE.

The TFT substrate 12 comprises a transparent insulating substrate such as glass, switching elements (not shown), various lines such as source line and gate line, and planarization layer which is an insulating film covering these elements. The switching elements are, for example, arranged in a matrix whose rows are arranged in the first direction X and whose columns are arranged in the second direction Y. The switching elements switch a connection between the source line and pixel electrode PE according to a signal supplied to the gate electrode.

The common electrode CE is disposed on the TFT substrate 12 and is covered with an insulating layer 13. A plurality of common electrodes CE extend in the first direction X and are aligned in the second direction Y. The common electrodes CE are formed of a transparent electrode material such as indium tin oxide (ITO) and indium zinc oxide (IZO). In the present embodiment, the common electrodes CE are used as drive electrodes for the sensor.

The pixel electrode PE is disposed on the insulating layer 13 and is covered with an alignment film (not shown). A plurality of pixel electrodes PE are, for example, arranged in a matrix whose rows are arranged in the first direction X and whose columns are arranged in the second direction Y. The pixel electrodes in the rows oppose to one common electrode CE through the insulating layer 13. The pixel electrodes PE are formed of a transparent electrode material such as indium tin oxide (ITO) and indium zinc oxide (IZO).

The first polarizer POL1 is disposed on a principal surface of the outside of the TFT substrate 12 (on the side opposite to the side on which the common electrode CE is disposed).

The counter substrate CT comprises a transparent insulating substrate 14 such as glass, color filter CF, sensing electrode SE, and second polarizer POL2.

The color filter CF is disposed on the transparent insulating substrate 14 to cover a black matrix (not shown) disposed thereon in a lattice form. The color filter CF comprises a plurality of coloring layers disposed in each of the pixels adjacent to each other in the first direction X. The coloring layer in the pixel in the first direction X has a color different from that of the adjacent pixels. The color filter CF comprises the coloring layers of resin materials colored in the primary colors of, for example, red, blue, and green. A red coloring layer (not shown) of a resin material colored red is disposed in the color filter CF to correspond to a red pixel. A blue coloring layer (not shown) of a resin material colored blue is disposed therein to correspond to a blue pixel. A green coloring layer (not shown) of a resin material colored green is disposed therein to correspond to a green pixel. The boundaries between the coloring layers overlap the black matrix. The color filter CF is covered by an overcoat layer (not shown). An overcoat layer is applied to the color filters to smooth out the unevenness on the color filter CF. The overcoat layer is covered with the alignment film (not shown).

The sensing electrode SE is disposed on a principal surface of the outside of the transparent insulating substrate 14 (on the side opposite to the side on which the color filter CF is disposed). A plurality of sensing electrodes SE extend in a direction (second direction Y) substantially orthogonal to the traveling direction of the common electrode CE (first direction X) and are aligned in the first direction X. The sensing electrodes SE are formed of a transparent electrode material such as indium tin oxide (ITO) and indium zinc oxide (IZO).

The second polarizer POL2 is disposed on the sensing electrode SE (on the side opposite to the side on which the color filter CF is disposed). A first polarizing axis of the first polarizer POL1 is, for example, orthogonal to a second polarizing axis of the second polarizer POL2 (in a cross-Nicol state). In that case, one polarizer is disposed in such a manner that its polarizing axis is in parallel with or orthogonal to an initial alignment direction of liquid crystal molecules.

FIG. 3 is an exemplary perspective view illustrating a structure of the common electrode CE and sensing electrode SE of the sensor-equipped display device shown in FIG. 2.

In this example, the common electrode CE is divided into a plurality of stripe electrode patterns extending in the second direction Y (right and left directions in FIG. 3). When an image signal is written into the electrode patterns, common voltage VCOM is sequentially applied (supplied) thereto by the display driver 30 and time divisional line sequence scanning drive is performed. When the sensor is activated, sensor drive signals Tx are sequentially applied to each electrode pattern (or each group of electrode patterns including a plurality of electrode patterns in combination) by the display driver 30. In the present embodiment, the sensor drive signals Tx sequentially applied to each electrode pattern (or each group of electrode patterns including a plurality of electrode patterns in combination) are referred to as sensor drive signals Tx1 to Txn. If the sensor drive signals Tx are sequentially applied to the electrode patterns, the number "n" of Txn stands for the number of electrode patterns, and if the sensor drive signals Tx are sequentially applied to the groups of the electrode patterns, the number "n" stands for the number of groups.

On the other hand, the sensing electrode SE is formed as a plurality (m) of stripe electrode patterns 1 to m extending in a direction orthogonal to the extending direction of electrode patterns of the common electrode CE. Each electrode pattern of the sensing electrode SE outputs the sensor detection value Rx to be input in the detection circuit 20 shown in FIG. 1. In particular in the present embodiment, the sensor detection values Rx output from the electrode patterns 1 to m are referred to as the sensor detection values Rx1 to Rxm.

Figure 4:
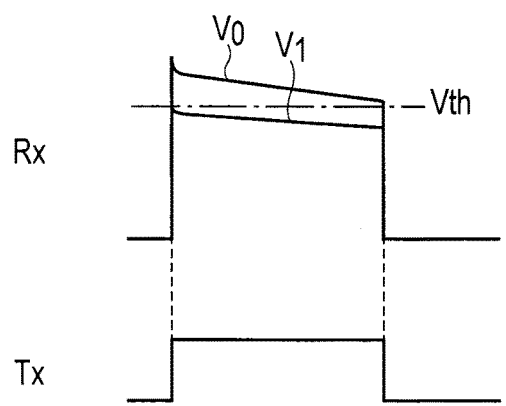
FIG. 4 is an exemplary view illustrating an example of a drive signal and a detection signal of a capacitive sensor.

FIG. 4 is an exemplary view illustrating an example of the drive signal and the detection signal of the capacitive sensor. The capacitive sensor comprises a pair of electrodes (the common electrode CE and the sensing electrode SE) oppose to each other with a dielectric element interposed therebetween. The capacitive sensor structures a first capacitive element.

The first capacitive element includes one end connected to an alternating signal source and the other end connected to the detection circuit 20 shown in FIG. 1 while being grounded through resistance. When an alternating rectangular wave (sensor drive signal Tx) of a predetermined frequency (a few to a dozen kHz, for example) is applied from the current signal source to the common electrode CE (one end of the first capacitive element), waveforms (the sensor detection value Rx) as shown in FIG. 4 appear in the sensing electrode SE (at the other end of the first capacitive element).

If a finger is not in contact with the sensor, current corresponding to the capacitive value of the first capacitive element flows according to charge/discharge in/from the first capacitive element. At that time, the potential waveform at the other end of the first capacitive element corresponds to, for example, waveform $V_0$ in FIG. 4 and is detected by the detection circuit 20.

On the other hand, if a finger is in contact with the sensor, a second capacitive element is formed by the finger, and the second capacitive element is added to the first capacitive element in series. In this state, current flows according to charge/discharge in/from the first and second capacitive elements. At that time, the potential waveform at the other end of the first capacitive element corresponds to, for example, waveform $V_1$ in FIG. 4 and is detected by the detection circuit 20. Here, the potential at the other end of the first capacitive element is partial potential defined by the current flowing in the first capacitive element and the second capacitive element, respectively. Therefore, the value of waveform $V_1$ is smaller than the value of waveform $V_0$ of the non-contact state. A contact of finger on the screen is thus determined by comparing the sensor detection value Rx to a threshold value Vth.

Note that the above-described method is used not only for detecting a contact of finger on the sensor but also for detecting a presence of finger hovering on the sensor since the sensor detection value Rx changes without the contact of finger on the sensor.

In the present embodiment, three dimensional information including information associating positional coordinates at which the electrode patterns (or a group of the electrode patterns) of the common electrode CE and the electrode patterns of the sensing electrode SE cross with the physical quantity (capacitance value between electrodes or voltage value of sensing electrodes) of the sensor detection value Rx at that position is referred to as raw data.

The sensing electrode SE outputs the raw data including the sensor detection values Rx1 to Rxm obtained at the time when the sensor drive signal Tx1 is applied to the electrode patterns (hereinafter referred to as raw data Tx#1). Similarly, the sensing electrode SE outputs the raw data including the sensor detection values Rx1 to Rxm obtained at the time when the sensor drive signal Tx2 is applied to the electrode patterns (hereinafter referred to as raw data Tx#2). This process is repeated during one detection period (one frame period) until the sensing electrode SE outputs the raw data including the sensor detection values Rx1 to Rxm obtained at the time when the sensor drive signal Txn is applied to the electrode patterns (hereinafter referred to as raw data Tx#n). In particular in the present embodiment, the raw data Tx#1 to Tx#n altogether are referred to as a raw data group.

FIG. 5 is an exemplary block view schematically illustrating a structure of the detection circuit 20 and the display driver 30 of the electronic device shown in FIG. 1.

The display driver 30 comprises a table selector TB to select one table from a plurality of tables (Table 1, Table 2 . . . ). Each table stores various values such as detection period of the sensor (a period in which a sensor horizontal period TSHD is at level H), a pulse width of the sensor drive signal Tx, and sensor driving method. The display driver 30 selects one of the tables, uses the information stored therein, and controls timing of the image display signal Sigx and the sensor drive signal Tx. Note that the pulse width of the sensor drive signal Tx used in detecting a hovering movement by the sensor may preferably be differed from that used in detecting a contact on the display device.

The detection circuit 20 comprises sensor processor 22, synchronization processor 24, table controller 26, sensor drive timing controller 28, and dataset processor DS.

The sensor processor 22 comprises a comparator COMP, A/D converter 222, filter 224, and timing controller TCON.

The comparator COMP receives the sensor detection value Rx from the sensor-equipped display device 10 and outputs a difference value with respect to a threshold Ref. A condenser and switch SW2 are connected to the comparator COMP in parallel. Furthermore, a switch SW1 is positioned in front of the comparator COMP to switch a connection between the sensor-equipped display device 10 and the condenser and switch SW2. The output from the comparator COMP is reset by switching the switch SW2. The switches SW1 and SW2 are switched under the control of the timing controller TCON.

The A/D converter 222 performs sampling the values output from the comparator COMP at predetermined intervals, stores the sampling values for a predetermined period of time, and outputs the sampling values to the filter 224 as digital signals. The filter 224 includes a digital filter such as an FIR filter. In the operation by the filter 224, coefficients (FIR coefficients) included in the sensor setting signals (TP setting) transmitted from the application processor 40 are used. After the operation, the filter 224 outputs the value calculated therefrom to the dataset processor DS as the raw data. That is, the raw data is digital data of a differential value between the sensor detection value Rx and the threshold Ref from which noise components are removed.

The table controller 26 generates the table selection request TRCRQ based on the table selection signal (Table Sel.) received from the application processor 40, and outputs the generated table selection request TRCRQ to a display driver. The table selection signal (Table Sel.) is transmitted from the application processor 40 to the detection circuit 20 in a structure based on a serial communication standard such as SPI and I2C. The table controller 26 converts the table selection signal (Table Sel.) into a parallel signal and outputs the parallel signal.

The sensor drive timing controller 28 receives the sensor setting signal (TP setting) from the application processor 40. The sensor setting signal (TP setting) is transmitted from the application processor 40 to the detection circuit 20 based on a serial communication standard such as SPI and I2C. The sensor drive timing controller 28 uses the frequency of the sensor drive signal Tx in the sensor setting signal (TP setting) and the number of pulses of the sensor drive signal Tx to generate a sensor drive timing signal EXVCOM, and outputs the sensor drive timing signal EXVCOM to the display driver 30.

The number of pulses and frequency of the sensor drive signal Tx are, preferably, adjusted to use the entire detection period of the sensor (the entire period in which a sensor horizontal period TSHD is at level H) stored in each table in the display driver 30. Therefore, preferably, the application processor 40 adjusts the number of pulses and frequency of the sensor drive signal Tx in the sensor setting signal (TP setting) in accordance with each table used.

The synchronization processor 24 receives sensor horizontal period TSHD and sensor vertical period TSVD from the display driver 30 to identify which electrode pattern (or which group of electrode patterns) is driven and which frame period is driven. The synchronization processor 24 outputs preset identification values of symbols and numbers, etc. in accordance with the identified electrode pattern and frame period.

The dataset processor DS gathers the raw data received from the sensor processor 22, sensor setting signal (TP setting) received from the application processor 40, information of the control by the display driver 30 based on the table configuration TRCST received from the display driver 30, and information of the control by the detection circuit 20 obtained from the synchronization processor 24 and sensor processor 22 to generate the dataset Data. The information items in the dataset Data are described below. The dataset processor DS outputs the dataset Data to the application processor 40. Here, the dataset processor DS transmits the dataset Data based on a serial communication standard such as SPI and I2C. In advance to the transmission of the dataset Data to the application processor 40, the dataset processor DS outputs an interruption request signal IRQ to the application processor 40.

FIG. 6 is an exemplary view illustrating an example of contents of the dataset Data generated by the dataset processor DS.

Depending on the raw data Tx#, the data in each dataset Data varies. For example, the dataset Data containing the raw data Tx#1 contains the raw data, DDI state, Touch IC state, start flag, and frame index. The frame index is an optional choice. The raw data here stands for the raw data Tx#1. The DDI state includes a time of touch, touch report rate (the number of divisions of display), voltage of the sensor drive signal Tx, and pulse width of the sensor drive signal Tx. The DDI state is the information of the control by the display driver 30. The Touch IC state includes the frequency of the sensor drive signal Tx, the number of pulses of the sensor drive signal Tx, and sensing module constant varying in accordance with these parameters. The Touch IC state is the information of the control by the detection circuit 20. The start flag is a flag to indicate that there is the raw data Tx#1 corresponding to the sensor drive signal Tx1 which has been applied firstly (to the first line) in a single detection period. The frame index is a data as a fallback in case of a loss in the dataset Data.

Note that the dataset Data containing the raw data Tx#1 is fully functional as long as the raw data and the start flag are contained therein, and the DDI state, Touch IC state, and frame index are only optional.

The dataset Data containing any one of the raw data Tx#2 to Tx#n contains the raw data (any one of the raw data Tx#2 to Tx#n), DDI state, Touch IC state, Tx number, and frame index. The DDI state, Touch IC state, Tx number, and frame index may be optional.

Note that the dataset Data is fully functional as long as the raw data is contained therein, and the DDI state, Touch IC state, Tx number, and frame index are only optional. The Tx number is a flag to indicate to what sensor drive signal Tx (to which line) in a single detection period the raw data corresponds. The Tx number is used to prevent a dropout of data.

Figure 7:
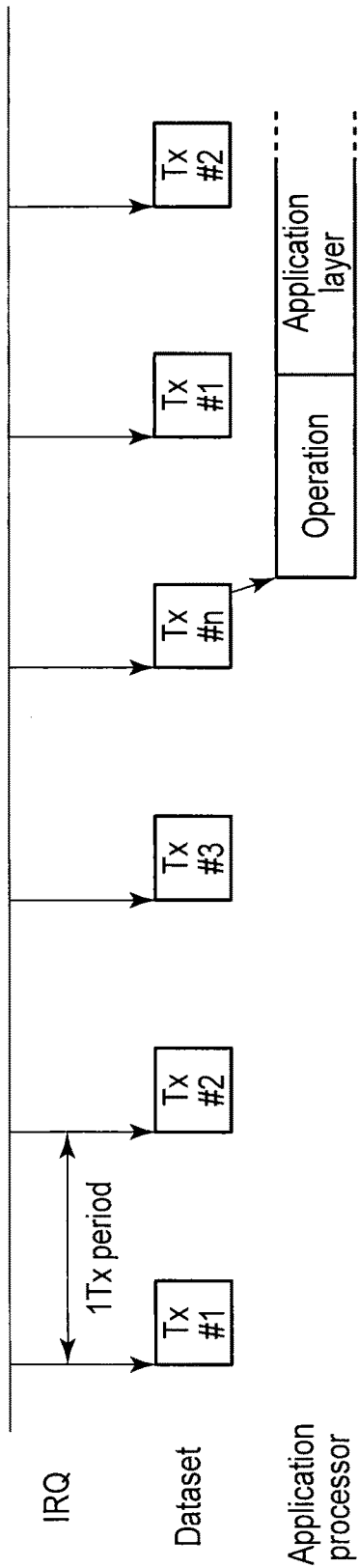
FIG. 7 is an exemplary view illustrating an example of a proper time to output the dataset.

FIG. 7 is an exemplary view illustrating proper times when the detection circuit 20 outputs the dataset Data in an H-Sync mode to the application processor 40.

When the dataset processor DS receives the first raw data Tx#1 in a single detection period from the sensor electrode SE, the dataset processor DS then outputs the interruption request signal IRQ to the application processor 40. The application processor 40 starts to read the dataset Data from the dataset processor DS in response to the interruption request signal IRQ. The dataset processor DS outputs the dataset Data containing the raw data Tx#1 shown in FIG. 6 to the application processor 40. That is, the dataset processor DS outputs the raw data Tx#1 (the first data detected in a single detection period) together with the start flag to the application processor 40.

Here, the dataset processor DS outputs the dataset Data containing the raw data Tx#1 to the application processor 40 while the drive voltage Tx2 is being applied to the common electrode CE (that is, while the raw data Tx#2 is being obtained).

A specific time for transmitting the dataset Data from the dataset processor DS to the application processor 40 is within 0.03 ms, for example. The size of the dataset Data is given by the number of Tx lines×16 bit, for example. The number of Rx lines corresponds to the number m of the electrode patterns of the sensing electrode.

Subsequently, the dataset processor DS receives the raw data Tx#2 from the sensing electrode SE and then outputs the interruption request signal IRQ to the application processor 40. The application processor 40 starts to read the dataset Data from the detection circuit 20 in response to the interruption request signal IRQ. The dataset processor DS outputs the dataset Data containing the raw data Tx#2 shown in FIG. 6 to the application processor 40.

Here, an interval between a transmission of IRQ from the dataset processor DS to the application processor 40 and the next transmission, in other words, an interval between a transmission of the dataset Data from the dataset processor DS to the application processor 40 and the next transmission (1Tx period) is, for example, 0.1 ms or more.

Similarly, when the dataset processor DS receives the last raw data Tx#n in a single detection period from the sensor electrode SE, the dataset processor DS then outputs the interruption request signal IRQ to the application processor 40. The application processor 40 starts to read the dataset Data from the dataset processor in response to the interruption request signal IRQ. The dataset processor DS outputs the dataset Data containing the raw data Tx#n shown in FIG. 6 to the application processor 40. The dataset processor DS sequentially outputs the dataset Data per sensor drive signal Tx unit, that is, at each time when one of the raw data Tx#1 to Tx#n is obtained.

That is, the detection circuit 20 outputs the detection data (raw data Tx#1 to Tx#n) including the physical quantity data obtained from the electrode patterns of sensing electrode SE to the application processor 40 at each time when the sensor drive signal Tx is applied to the common electrode CE.

The same applies to raw data Tx#1 to Tx#n of the next detection period, and the dataset processor DS sequentially outputs the dataset Data including different raw data to the application processor 40. Note that a period of time in which the dataset processor DS transmits the entire raw data of a single detection period to the application processor (an interval from the start of output of the dataset Data including the raw data Tx#1 to the start of output of the dataset Data including raw data Tx#n) is, for example, 8.4 ms.

The application processor 40 sequentially stores raw data Tx#1 to Tx#n in a single detection period in a memory. After the raw data Tx#1 to Tx#n in a single detection period have been stored completely, the application processor 40 executes operation processing (three dimensional data processing) using the raw data group including the raw data Tx#1 to Tx#n.

Figure 8:
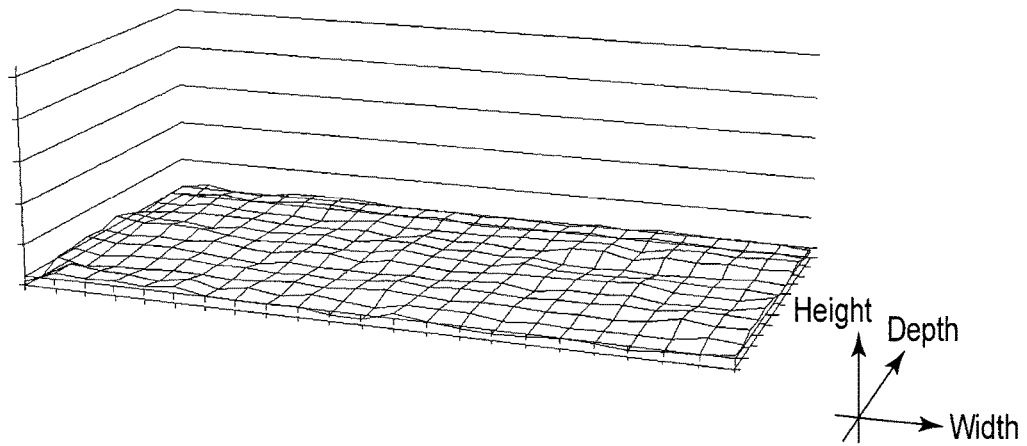
FIG. 8 shows an example of three dimensional data based on a raw data group generated from a sensor processor.
Figure 9:
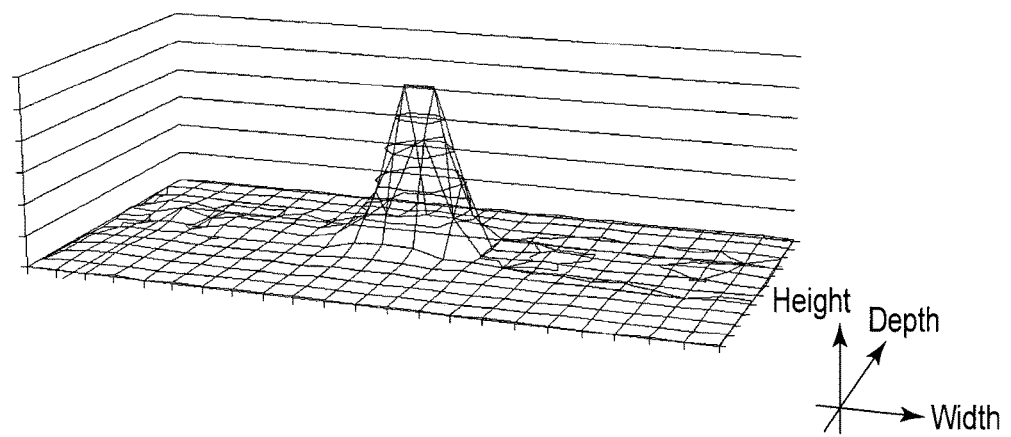
FIG. 9 shows an example of three dimensional data based on a raw data group generated from a sensor processor.

Each of FIGS. 8 and 9 shows an example of three dimensional data generated based on the raw data group. FIG. 8 illustrates an example of three dimensional data based on the raw data group obtained at the time when an object such as a finger of a user is not close to the sensor. Contrary, FIG. 9 illustrates an example of three dimensional data based on the raw data group obtained at the time when an object such as a finger of a user is close to the sensor.

Note that the raw data group is plotted in FIGS. 8 and 9 using the width direction (scanning direction by the sensor drive signal Tx) and the depth direction as positional coordinates and using the height direction as the physical quantity.

The application processor 40 executes processes (App. layer) by various applications using the three dimensional data obtained from the operation processing.

The application processor 40 may be configured to stop using the entire raw data (the raw data Tx#1 to Tx#n) in a single detection period if there is at least one defected data in the raw data Tx#1 to Tx#n in a single detection period. This will prevent an erroneous detection by the application processor 40 due to a lack of raw data.

According to the present embodiment, the data transmission from the detection circuit 20 to the application processor 40 can be performed efficiently, and waiting time (latency) can be reduced. Furthermore, according to the present embodiment, the detection circuit 20 sequentially outputs the dataset Data including any one of the raw data Tx#1 to Tx#n to the application processor 40 with a simple structure. The detection circuit 20 does not need to store the raw data Tx#1 to Tx#n sequentially. Thus, the memory volume in the detection circuit 20 can be reduced.

Moreover, at the last phase of a single detection period, only the raw data Tx#n is included in the dataset Data output from the detection circuit 20 to the application processor 40. Therefore, the application processor 40 can start the operation processing using the raw data group immediately after the reception of the raw data Tx#n.

That is, a period of time between the start of transmission of the last dataset Data in a single detection period by the detection circuit 20 and the start of the operation processing by the application processor 40 using the raw data group can be shortened as compared to a period of time between the start of the transmission of a single dataset Data including the entire raw data Tx#1 to Tx#n by the detection circuit 20 and the start of the operation processing by the application processor 40 using the same single dataset Data. Consequently, the application processor 40 can update the display screen fast.

Furthermore, the application processor 40 executes the operation processing, without using the coordinates detected by the sensor, but with the raw data group including three dimensional information including the coordinates and physical quantity, and executes various applications using the three dimensional data. Therefore, the performance of the electronic device can be enhanced. Even when the sensor is structured with higher definition, the present embodiment can be applied to the device without any special structural modification to the detection circuit 20. As can be described above, the present embodiment can provide a highly versatile electronic device and a controlling method of the same.

Note that, in the present embodiment, the application processor 40 may be achieved as a hardware structure or a software structure.

Note that the above description has been directed to the sensor-equipped display device comprising a liquid crystal display device as a display device; however, the description may be applicable to a sensor-equipped display device comprising the other display devices such as an organic electroluminescence display device.

Furthermore, in the example shown in FIG. 2, the liquid crystal display device is structured such that the array substrate AR comprises both the pixel electrode PE and the common electrode CE, in other words, structured as In-Plane Switching (IPS) mode or Fringe Field Switching (FFS) mode to mainly use the lateral electric field; however, the liquid crystal display device is not limited to these structures. As long as the array substrate AR comprises the pixel electrode PE, either the array substrate AR or the counter substrate CT may comprise the common electrode CE.

In a structure to mainly use the vertical electric field such as Twisted Nematic (TN) mode, Optically Compensated Bend (OCB) mode, and Vertical Aligned (VA) mode, the counter substrate CT comprises the common electrode CE. That is, the position of the common electrode CE may be optional between the insulating substrate of the TFT substrate 12 and the insulating substrate 14 of the counter substrate CT.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display device comprising a plurality of first electrodes arranged in a matrix form, second electrodes opposite to the first electrodes, the second electrodes including a plurality of electrode patterns extending in a first direction and aligned in a second direction to cross the first direction, and third electrodes opposite to the second electrodes, the third electrodes including a plurality of electrode patterns extending in the second direction and aligned in the first direction;
a display driver configured to apply a sensor drive signal to the plurality of electrode patterns of the second electrodes sequentially; and
a detection circuit configured to transmit a detection data including physical quantity data detected from the plurality of electrode patterns of the third electrodes at each time when the sensor drive signal is applied to the plurality of electrode patterns of the second electrodes, wherein
the detection circuit outputs an interruption request signal each time the detection circuit detects the physical quantity data from the plurality of electrode patterns of the third electrodes and transmits the detection data according to a response to the interruption request signal,
the detection data includes an identification value which identifies an electrode pattern and a frame period which are driven at a time of detection, and
the driven electrode pattern and the driven frame period are identified based on a horizontal period signal and a vertical period signal which the detection circuit receives from the display driver.

2. The electronic device of claim 1, wherein the detection circuit transmits an initial detection data in a single detection period with a start flag indicative that the transmitted data is an initially detected data.

3. The electronic device of claim 2, wherein the detection data contains a plurality of positional coordinates indicative of positions at which the electrode patterns of the second electrodes and the electrode patterns of the third electrodes cross with each other and voltage value data associated with each of the positional coordinates.

4. The electronic device of claim 1, wherein the detection circuit transmits a previously detected detection data while detecting a new detection data from the plurality of electrode patterns of the third electrodes.

5. A control method of an electronic device comprising a display device including a plurality of first electrodes arranged in a matrix form, second electrodes opposite to the first electrodes, the second electrodes including a plurality of electrode patterns extending in a first direction and aligned in a second direction to cross the first direction, and third electrodes opposite to the second electrodes, the third electrodes including a plurality of electrode patterns extending in the second direction and aligned in the first direction, the control method comprising:

applying, via a display driver, a sensor drive signal to the plurality of electrode patterns of the second electrodes sequentially;

detecting, via a detection circuit, physical quantity data from the plurality of electrode patterns of the third electrodes at each time when the sensor drive signal is applied to the plurality of electrode patterns of the second electrodes;

outputting, via the detection circuit, an interruption request signal each time the detection circuit detects the physical quantity data from the plurality of electrode patterns of the third electrodes; and transmitting, via the detection circuit, the detection data according to a response to the interruption request signal, wherein the detection data includes an identification value which identifies an electrode pattern and a frame period which are driven at a time of detection, and the driven electrode pattern and the driven frame period are identified based on a horizontal period signal and a vertical period signal which the detection circuit receives from the display driver.

6. The control method of claim 5, further comprising transmitting an initial detection data in a single detection period with a start flag indicative that the transmitted data is an initially detected data.

7. The control method of claim 5, further comprising transmitting, via the detection circuit, a previously detected detection data while detecting a new detection data from the plurality of electrode patterns of the third electrodes.

* * * * *